(12) United States Patent
Hargett

(10) Patent No.: US 7,096,002 B2
(45) Date of Patent: Aug. 22, 2006

(54) SECURITY SYSTEM

(75) Inventor: Gerald Joseph Hargett, Kingwood, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 228 days.

(21) Appl. No.: 10/264,370

(22) Filed: Oct. 4, 2002

(65) Prior Publication Data

US 2004/0192250 A1    Sep. 30, 2004

(51) Int. Cl.
*H04M 11/04*    (2006.01)

(52) U.S. Cl. .............. 455/404.2; 455/404.1; 455/456.5; 340/573.1; 340/438; 342/357.07; 342/357.09

(58) Field of Classification Search .............. 455/404.1, 455/404.2, 414.1, 456.5, 456.1; 342/357.07, 342/357.09, 357.06; 340/988, 991, 993
See application file for complete search history.

(56) References Cited

U.S. PATENT DOCUMENTS

| | | | |
|---|---|---|---|
| 4,651,157 A | 3/1987 | Gray et al. | 342/457 |
| 4,833,477 A | 5/1989 | Tendler | 342/389 |
| 5,233,844 A | 8/1993 | Knippscheer et al. | 62/440 |
| 5,400,011 A | 3/1995 | Sutton | 340/566 |
| 5,555,286 A | 9/1996 | Tendler | 379/59 |
| 5,808,564 A | 9/1998 | Simms et al. | 340/990 |
| 5,933,080 A | 8/1999 | Nojima | 340/539 |
| 6,343,010 B1 | 1/2002 | Tanaka | 361/687 |
| 6,522,265 B1* | 2/2003 | Hillman et al. | 340/988 |
| 6,597,915 B1* | 7/2003 | Shi et al. | 340/825.49 |
| 6,681,120 B1* | 1/2004 | Kim, II | 455/556.1 |
| 6,771,969 B1* | 8/2004 | Chinoy et al. | 455/456.1 |
| 6,799,049 B1* | 9/2004 | Zellner et al. | 455/456.1 |
| 6,807,564 B1* | 10/2004 | Zellner et al. | 709/206 |
| 2001/0034233 A1 | 10/2001 | Tiedemann et al. | |
| 2002/0021231 A1 | 2/2002 | Schlager et al. | |
| 2003/0050039 A1* | 3/2003 | Baba et al. | 455/404 |

* cited by examiner

*Primary Examiner*—Danh Cong Le
(74) *Attorney, Agent, or Firm*—W Robinson H. Clark; Joseph J. Dvorak

(57) ABSTRACT

A navigation unit on board a mode of transportation is coupled to a communication device for transmitting an emergency call to a remote tracking center when an emergency button on the mode of transportation is depressed. The communication device is not audible or visible at the mode of transportation. Additionally the communication device is capable of being activated from a remote tracking center.

5 Claims, 2 Drawing Sheets

SECURITY SYSTEM

The present invention is broadly concerned with a security system for protecting a mode of transportation. More specifically the invention relates to a security system especially suitable for marine vessels, aircraft and vehicles that provides emergency activation and remote monitoring capabilities.

BACKGROUND OF INVENTION

There are a wide variety of emergency alarm systems known in the art that are capable of providing location dependent information to a remote location such as a control center or public safety answering point. Typically these systems have readily recognizable activation consoles or switches and often generate audible and visual alarms. Under certain circumstances those features are undesirable. For example, the safety of personnel attempting to activate such a system could be compromised if the need to do so was prompted by threat of theft or terrorist activity. Therefore, there remain a need for an emergency alarm system that can be activated with reasonable secrecy.

There is also a wide variety of remote audio monitoring security system known in the art. Typically these systems have a local activation mechanism that permits the transmission of sound to a remote location. Such systems, however, rely on there being personnel present at a local site being able to activate the system. Therefore, there is a need for a security system which permits a remote location to track the location of a mode of transportation and to receive audible information without the need for activation of the system at a local site.

Thus an object of the present invention is to provide a security system which overcomes shortcomings of known systems.

SUMMARY OF THE INVENTION

Accordingly, a navigation unit on board a mode of transportation is coupled to a communication device for transmitting an emergency call to a remote tracking center when an emergency button on the mode of transportation is depressed. The communication device is one which is not audible or visible at the mode of transportation. The communication device includes a speech synthesizer programmed to provide information identifying the mode of transportation and its position as determined by the navigation unit. The invention further includes dial-up capability whereby a remote tracking center can access the navigational unit and obtain the identifying information and location of the mode of transportation. Additionally, the communication system includes at least one microphone which is capable of being activated at the remote tracking center.

The foregoing features and others with their advantages will become more apparent upon a reading of the detailed description provided herein.

DETAILED DESCRIPTION OF THE INVENTION

Figure 1:
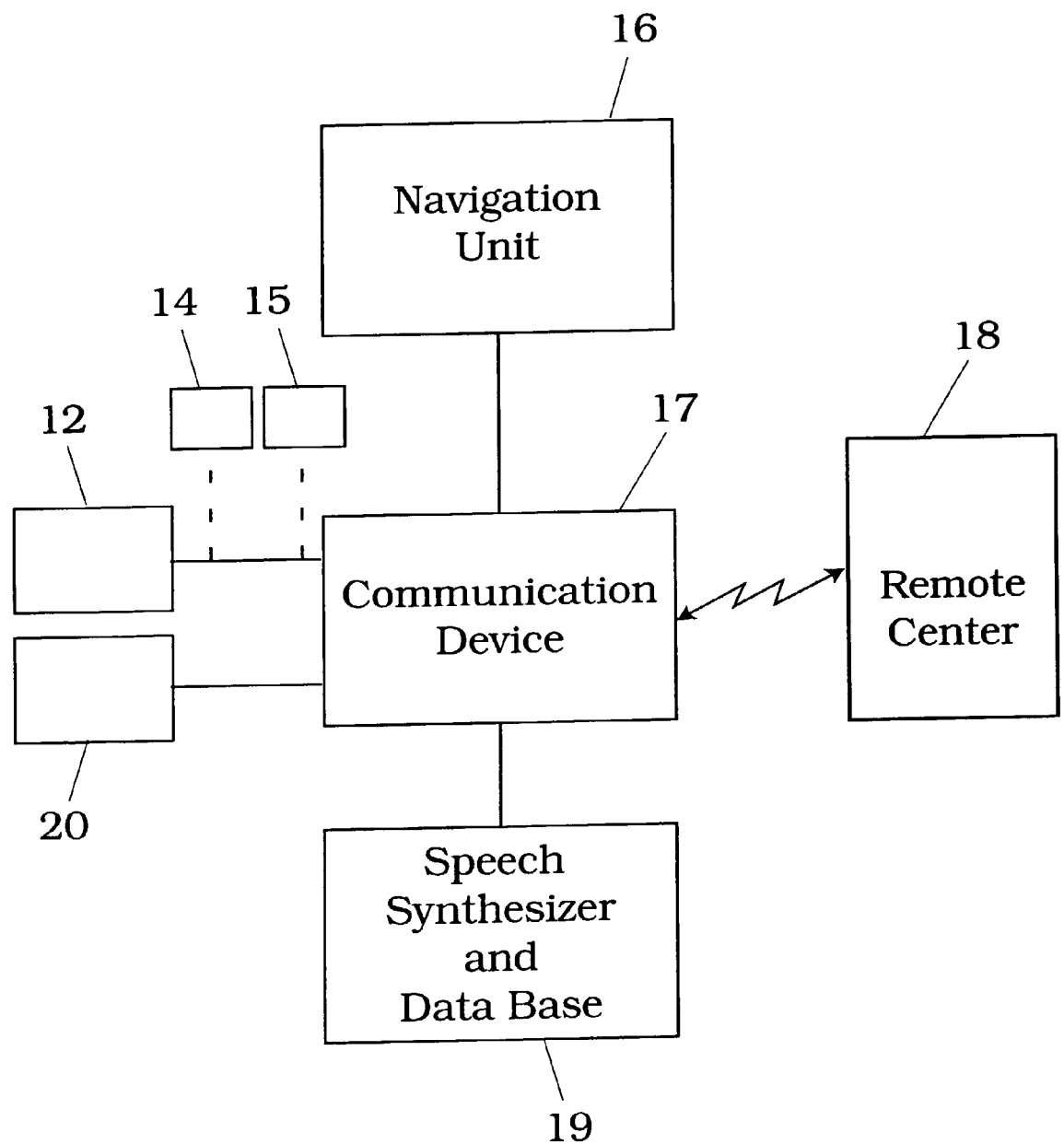
FIG. 1 is a block diagram of the subject system.

Although the system of the present invention is applicable to any mode of transportation including vehicles, aircraft and vessels, for convenience the invention will be described with specific reference to a marine vessel. Thus, a marine vessel is provided with the security system 10 shown in the accompanying Figure.

The security system 10 is provided with at least one emergency button 12 located inconspicuously at a security personnel station such as at the vessel bridge console. Optionally and preferably, additional inconspicuous emergency buttons such as 14 and 15 may be located at other strategic locations on the vessel such as engine room console and cargo control room.

A navigation unit 16 such as an omega, loran or global positioning system (GPS) is operably connected to a communication device 17 capable of transmitting an emergency call to a remote tracking center 18 when an emergency button 12, 14 or 16 is depressed. Preferably the navigation unit 16 is a GPS. Importantly, the communication device 16 is one which is not audible where it is installed on the vessel, i.e., at the local site, moreover, the communication device 16 preferably is installed at a location where it can not be seen.

The communication device 16 is provided with a speech synthesizer and database 19 such that upon activation communication device 17 will dial remote center 18 and verbally supply information from the database 19 regarding the vessel and its location obtained from the navigation unit 16.

The communication device 16 is capable of dialing one or a series of preprogrammed numbers in sequence that are stored in the database 19. Device 16 is designed to continue to dial those numbers until it receives a reset code from any of the parties called. When the dialed number at the remote center 18 is answered a verbal message is transmitted such as the vessel name and other identifier, a statement that the alert is activated and contact phone number, and a position report is given. Each part of the message is repeated three times.

The communication device 16 is connected to a microphone 20 located at a suitable strategic location on the vessel along with means for activating or deactivating the microphone 20 from the remote center 18. For example, device 16 is provided with dial-up capability from center 18. When connected to device 16 center 18 may enter any one of a number of code numbers which will operate to activate or deactivate microphone 20, if already activated.

This dial-up capability is also provided with means for remote center 18 to enter a code which will activate the device 16 to provide location information even though the device 16 was not activated on the vessel.

Figure 2:
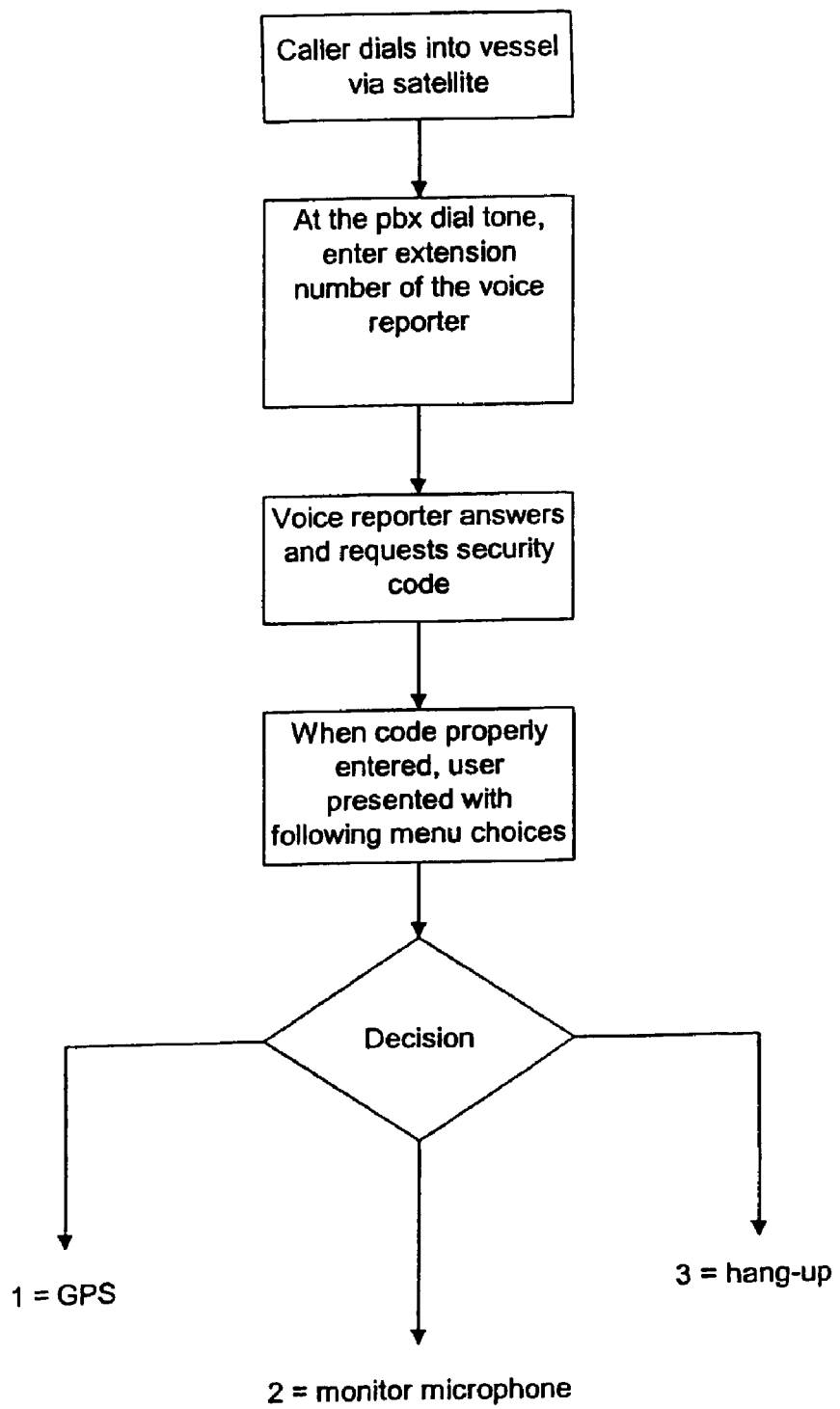
FIG. 2 is a flow chart for remote addressing of the subject system.

One embodiment of the dial-in options is shown in FIG. 2. In this embodiment a caller from a remote location accesses the local pbx number and after entering the proper code is presented with a memo such as accessing the GPS, the microphone and terminating the call.

Importantly, the communication device is one which does not generate an audible noise or signal at its location on the vessel.

Optional features for the system of the invention include a battery backup and light emitting diodes for indicating system conditions such as power, activation condition, reset status, whether the system is operating and whether the battery is weak and needs replacing.

The foregoing describes what, at present, is considered to be the preferred embodiments of the invention. It should be understood, however, that other embodiments and modifications falling within the spirit and scope of the invention are intended to be covered by the appended claims.

What is claimed is:

1. A security system for protecting a mode of transportation, the system comprising:
   a navigation unit;
   a communication device coupled to the navigation unit, including a speech synthesizer, wherein said communication device is capable of transmitting an emergency call to at least one remote center and providing a report identifying the mode of transportation on which the communication device is positioned and the mode of transportation's location,
   at least one emergency button on the mode of transportation for activating the communication device by personnel in response to an emergency;
   a database for at least one phone number of a remote center and storage for a pre-recorded message identifying the mode of transportation;
   a microphone connected to the communication device, that is capable of being activated or deactivated from the remote center, for audible monitoring at the local site by the remote center, and
   a dial-up number whereby a caller from the remote center may initiate contact with the communication device.

2. The security system of claim 1 wherein the communication device is programmed to dial at least one phone number at a remote center.

3. The system of claim 2 wherein the communication device is programmed to sequentially dial a plurality of phone numbers at a remote center until answered by any of the parties called.

4. The system of claim 1 wherein a caller from the remote center can initiate contact with the communication device and independently activate the communication device so that it transmits a verbal report identifying the location of the mode of transportation.

5. The system of claim 4 wherein the caller from the remote center accesses a local pbx number and, after entering a code, is presented with a menu for accessing a list of items including the GPS and microphone.

* * * * *